United States Patent [19]

Davidson

[11] 4,320,509
[45] Mar. 16, 1982

[54] LSI CIRCUIT LOGIC STRUCTURE INCLUDING DATA COMPRESSION CIRCUITRY

[75] Inventor: Robert P. Davidson, Long Valley, N.J.

[73] Assignee: Bell Telephone Laboratories, Incorporated, Murray Hill, N.J.

[21] Appl. No.: 86,299

[22] Filed: Oct. 19, 1979

[51] Int. Cl.³ .............................................. G06F 11/26
[52] U.S. Cl. ...................................... 371/25; 371/18
[58] Field of Search ....................... 371/25, 15, 16, 18

[56] References Cited

U.S. PATENT DOCUMENTS

| | | | |
|---|---|---|---|
| 3,582,633 | 6/1971 | Webb | 371/25 |
| 3,958,110 | 5/1976 | Hong et al. | 371/15 |
| 3,976,864 | 8/1976 | Gordon et al. | 371/26 |
| 4,074,851 | 2/1978 | Eichelberger et al. | 371/25 |
| 4,167,780 | 9/1979 | Hayashi | 371/18 X |
| 4,176,258 | 11/1979 | Jackson | 371/25 X |

OTHER PUBLICATIONS

Pynn, "In-Circuit Tester Using Signature Analysis Adds Digital LSI to its Range", *Electronics*, May, 24, 1979, pp. 153–157.

*Primary Examiner*—David H. Malzahn
*Attorney, Agent, or Firm*—Arthur J. Torsiglieri

[57] ABSTRACT

A logic structure for an LSI digital circuit includes data compression circuitry for deriving a signature word from the data on a multiplicity of internal nodes which are not directly accessible from the terminals of the circuit. The signature word provides error information concerning the data on the internal nodes which are not otherwise available for testing purposes. The addition of data compression circuitry facilitates the testing of LSI digital circuits and can be complemented with minimal overhead chip area.

10 Claims, 8 Drawing Figures

LSI CIRCUIT LOGIC STRUCTURE INCLUDING DATA COMPRESSION CIRCUITRY

BACKGROUND OF THE INVENTION

This invention relates to the logic structure of large scale integrated (LSI) digital circuits and more particularly to an LSI digital circuit logic structure in which additional logic functions are included for the purpose of facilitating the testing of the circuit.

Digital LSI circuits in which hundreds or even thousands of logic gates are fabricated on a single substrate chip, typically of silicon or sapphire, to form a complete system or subsystem are well known in the art. LSI technology provides a circuit with the advantages of lower power dissipation, higher performance, and lower cost. As a result, LSI circuits have found wide acceptance, for example, as logic and memory circuits in digital computers, communication systems and the like.

A conventional LSI circuit comprises a plurality of terminals typically in the form of metallic bonding-pads or beam leads on the chip used for applying input signals and for extracting output signals, a plurality of functional parts, each for performing a function or a set of functions and each comprising a network of logic gates and/or memory elements, the functional parts being interconnected at a multiplicity of internal nodes not directly connected to the terminals. Examples of such a circuit are the commercially available single-chip microprocessors.

In recent years both the packing density and complexity of LSI digital circuits have grown rapidly owing primarily to advances in metal-oxide-semiconductor (MOS) technology. Today, circuits such as the 16-bit microprocessor having in excess of 10,000 logic gates on a single chip are commercially available. A circuit having a gate count of 10,000 or greater is sometimes referred to as very large scale integrated (VLSI) circuit.

In general, as LSI digital circuits increase in complexity it becomes more difficult to perform functional tests on such circuits. Functional tests are used to determine whether a digital circuit performs its intended logical function. Since all integrated circuits are subject to fabrication defects and other failure mechanisms, a primary concern of both manufacturers and users of integrated circuits is the design of functional tests which are capable of detecting all possible logical faults which may occur in such circuits. For highly complex LSI circuits exhaustive functional tests are expensive to perform and in many cases impossible to design. Therefore, testing difficulties in LSI circuits give rise to higher manufacturing costs for such circuits as well as lower reliability for circuits which are not capable of being exhaustively tested.

Generally, integrated circuit functional tests can be divided into three types, namely diagnostic, production, and field site tests. Diagnostic tests are used to identify design errors and fabrication problems in a circuit when it is first manufactured. Thus, a diagnostic test is designed not only to detect logical faults in a circuit under test but also to locate and identify a detected fault.

Production tests are used to screen out faulty circuits after completion of fabrication as part of the manufacturing process. Production tests are designed to merely detect any logical faults in a circuit under test and are generally simpler and less time consuming than a diagnostic test.

Both diagnostic and production tests are normally performed at the manufacturing facility. The usual approach to such tests is to apply a sequence of binary patterns called test vectors to the input terminals of a circuit under test and to observe a resulting sequence of binary patterns called output pattern at the output terminals of the circuit. The output patterns which are generated by the circuit in response to the applied test vectors are compared to those expected from a fully functioning circuit; any disagreement between an observed output pattern and a corresponding expected output pattern indicates a faulty circuit. The percentage of all possible faults detectable by a test is commonly referred to as the fault coverage for the test.

In general, the length of a test vector sequence needed to maximize fault coverage increases with the complexity of the circuit tested. A typical production test for a particular prior art microprocessor, for example, contains tens of thousands of test vectors. A diagnostic test for the same circuit would have even more test vectors. The need for such lengthy test vector sequences makes such tests expensive to perform and makes necessary the use of powerful computer controlled test equipment for applying the test vectors. However, even with lengthy test vector sequences, the fault coverage of functional tests on many prior art LSI circuits is less than 100 percent.

Field-site tests of integrated circuits are typically performed while the circuits are situated in the systems in which they are used. Such tests may either be performed during troubleshooting of a malfunctioning system or, in the case of systems having built-in self-testing features, on a repetition basis while the system is operating. Because the test equipment used for field-site testing is generally less powerful than that used for production testing, field-site tests tend to be simpler than production tests. Consequently, the fault coverage of field-site tests are typically less than that of production tests.

It is well known that the problems of long test vector sequences and less than complete fault coverage in complex LSI circuits are directly related to the inaccessibility of signals on the internal nodes of such circuits. Unlike digital circuits implemented on printed circuit boards, the internal nodes of an integrated circuit cannot be probed during testing. Therefore, in many cases the responses of the various functional parts of an integrated circuit to applied test vectors cannot be directly observed, and an erroneous response from a functional part can be detected only if that response causes an erroneous output pattern. However, in many prior art LSI circuits a significant number of possible logical faults remain undetectable because the erroneous signals caused by such faults cannot be made to appear as erroneous output patterns. In such circuits, higher fault coverage and shorter test vector sequences would be possible if signals on selected internal nodes can be analyzed for errors from the terminals of the circuits.

One known approach for improving accessibility to signals on selected internal nodes of an integrated circuit is to provide additional terminals which are directly connected to such nodes. However, this approach is not practicable for LSI circuits where the number of selected internal nodes may far exceed the number of extra terminals (i.e., bonding pads or beam leads) which can be accommodated by the circuit chip.

Another prior art technique for improving accessibility to signals on internal nodes of LSI circuits is described in the references, "A Logic Design Structure for LSI Testability" by E. B. Eichelberger and T. N. Williams, *Proceedings of the 14th Design Automation Conference, IEEE Catalog,* No. 77 CH1216-1C, New Orleans, June 1977, pages 462–468, and "Level-Sensitive Scan Design Test Chips, Boards, Systems", by N. C. Berglund, *Electronics,* Vol. 52, No. 6, March 15, 1979, pages 108–110. The Eichelberger et al. and Berglund references describe, among other things, an LSI circuit logic structure in which a shift register latch (SRL) is associated with each selected internal node of the circuit. All the SRLs are connected to be operable as a single long shift register. The signals on the selected internal nodes are stored in their associated SRL and may be shifted out serially to a single output terminal under the control of a sequence of clock pulses.

However, the SRL technique has several deficiencies. Owing to the slowness of the conversion of the parallel data on the selected internal nodes to the serial data at the output terminal, the technique cannot be used to test a circuit which is operating at its full rated speed. Therefore, speed related faults (ac faults) may escape detection with the SRL method. Furthermore, error detection with the SRL method requires that the long bit-stream from the shift register must be examined on a bit-by-bit basis, making tests with this technique time consuming. Moreover, implementation of the SRL technique requires a large overhead in chip area, particularly where large numbers of internal nodes are accessed. Thus, the SRL technique tends to be expensive to implement.

Therefore, a need clearly exists for an LSI circuit logic structure for improving circuit testability which would permit rapid error analysis of data signals on a large number of internal nodes detecting ac as well as dc faults, and one which may be implemented with minimal overhead chip area.

SUMMARY OF THE INVENTION

The present invention is an LSI circuit logical structure comprising a plurality of terminals, a plurality of functional parts interconnected at a multiplicity of internal nodes not directly connected to any of the terminals, clock generating circuit means for providing a sequence of clock signals;

Characterized in that there are included spatial data compression means comprising combinational parity generating circuit means coupled to a group of selected internal nodes and responsive to signals on the group of selected nodes for deriving a parity signal, temporal data compression means comprising sequential signature generating circuit means responsive to the sequence of clock signals for sampling the parity signal over a fixed interval of time and for generating and storing a signature word of a predetermined length, and output means for transferring the signature word to selected terminals.

Thus, the integrity of signals from a large number of internal nodes over a fixed interval of time may be ascertained by analyzing a signature word provided at a few selected terminals. The spatial and temporal data compression means may be implemented with minimal overhead in chip area and permits detection of ac, as well as dc faults.

The objects of the invention are achieved in the illustrative embodiments described hereinafter. The novel features of the invention, both as to structure and method of operation, together with the other objects and advantages thereof will be better understood from the following detailed description considered in connection with the accompanying drawing. It is to be expressly understood, however, that the drawing is solely for the purpose of illustration and description and is not intended to define any limits of the invention.

DETAILED DESCRIPTION

Figure 1:
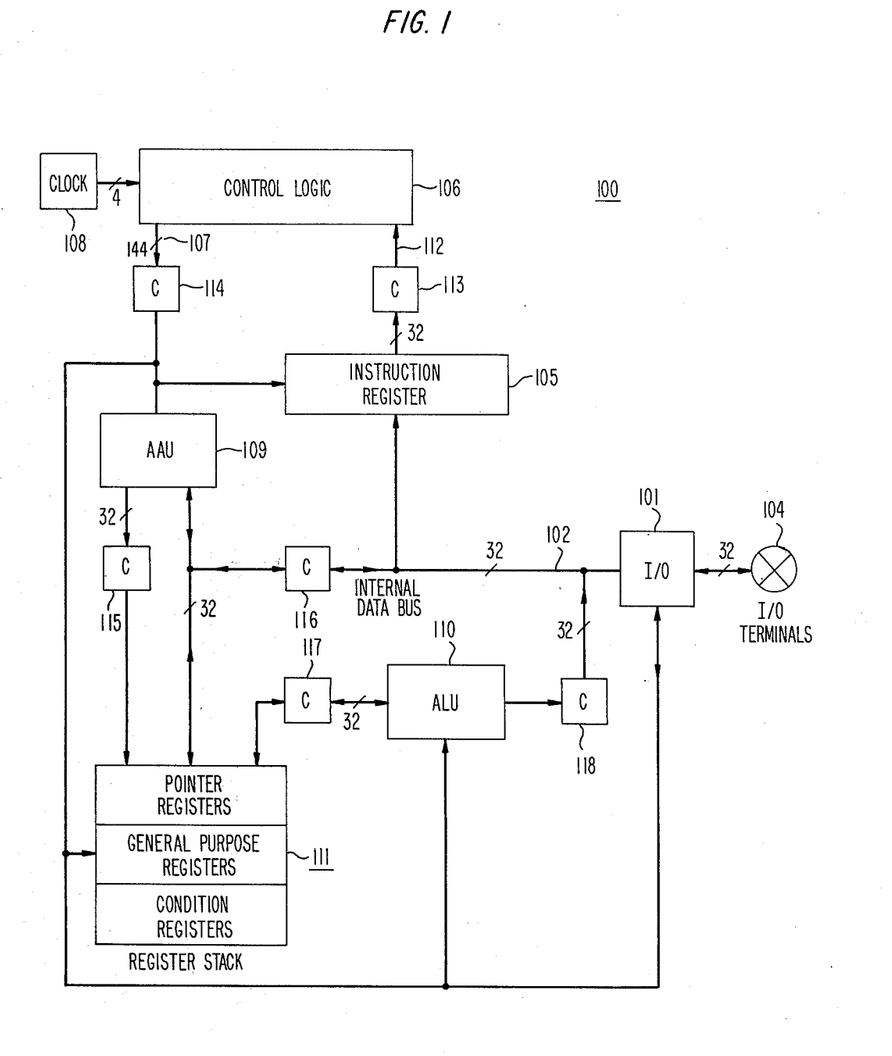
FIG. 1 is a block diagram representing an LSI digital circuit (microprocessor) showing the locations of internal nodes where data compression circuits may be advantageously used to improve circuit testability in accordance with the invention.

Referring now to FIG. 1 there is shown a functional block diagram representative of a 32-bit single chip microprocessor in which only those functional parts which are essential to the explanation of the present invention are shown. A microprocessor is being used as an example of a complex digital LSI circuit which could be made more easily testable by increasing the accessibility to signals on its internal nodes. In general testing difficulties in digital LSI circuits arise when internal nodes connected to those functional parts containing sequential networks are not sufficiently accessible to permit error analysis on the state variables of the sequential network. Therefore, many types of LSI digital circuits other than microprocessors can be made more easily testable by increasing the accessibility of signals on selected internal nodes for error analysis in accordance with the invention.

Of the functional parts shown in FIG. 1, the input/output circuit (I/O) 101 which provides bidirectional coupling of the Internal Data Bus 102 and the Arithmetic and Logic Unit (ALU) 110 to thirty-two I/O terminals 104. During the input mode of the microprocessor, the I/O circuit transfers instructions, addresses, or operands from the I/O terminals to the Internal Data Bus. During the output mode, the I/O circuit transfers data or addresses from the Internal Data Bus or data from the ALU to the I/O terminals. Thus, the thirty-two I/O terminals serve as input terminals during the input mode and as output terminals during the output mode. In addition to the I/O terminals, the circuit of FIG. 1 also has a plurality of other terminals which are not shown such as terminals for applying power supply voltages, etc. The Instruction Register 105 receives and stores the op-code and address mode code portions of an instruction from the Internal Data Bus for subsequent transfer to the Control Logic 106. The Control Logic responds to the op-code and address mode code received from the Instruction Register by generating a sequence of control signals on 144 Control Lines 107. The control signals are distributed to the other functional parts to govern the performance of operand address formation as specified by the address mode code and the execution of a processor operation as specified by the op-code. Timing for the control signal sequence is provided by a four-phase Clock Generating Circuit 108. Operand address formation is performed in the Address Arithmetic Unit (AAU) 109. Arithmetical and logical operations are performed in the Arithmetic and Logic Unit (ALU) 110. A Register Stack 111 contains pointer registers, general purpose registers, and condition registers for storing addresses, data, and the condition status of various functional parts, respectively.

The various functional parts shown in FIG. 1 are interconnected at a multiplicity of internal nodes, for example 113 through 118, which are not directly accessible to the I/O terminals or to any other terminals of the microprocessor. The signals on some of the internal nodes are important for functional testing. For example, the Control Logic is the most highly sequential functional part of the entire microprocessor and is, therefore, the most difficult part to thoroughly test owing to the inaccessibility of its output signals. Usually, most of the undetectable logical faults in a conventional microprocessor reside in the control logic. Therefore, functional testing of the circuit of FIG. 1 would be facilitated by making the output lines 107 of the control logic accessible for error detection.

In FIG. 1 the internal nodes of special interest for functional testing are designated with blocks labeled with the letter "C" and indicated by reference numerals 113 through 118. By making all the designated nodes accessible for error detection, the circuit shown may be tested with substantially 100 percent fault coverage. The lines of the Internal Data Bus and the output lines of the ALU have been designated as internal nodes (116 and 118, respectively), even though they may be coupled to the I/O terminals, because during some operating phases, the Internal Data Bus and the ALU output lines are isolated from the I/O terminals as well as other terminals and are, therefore, effectively internal nodes. Taking into account the multiple nodes represented by each of the blocks 113 through 118, there are a total of 304 internal nodes designated for access. Bringing each of the designated nodes out to a separate terminal is impracticable since the number of such nodes greatly exceeds the number of bonding pads (typically 64) on the chip. Even if the separate signals from each designated internal node could be brought out of the circuit chip, such a large number of signals would be too cumbersome to be handled by even the most powerful automatic test equipment. Therefore, in order to make practical use of the data on the designated internal nodes, the quantity of that data must be compressed while retaining the error detection information on that data.

Figure 2:
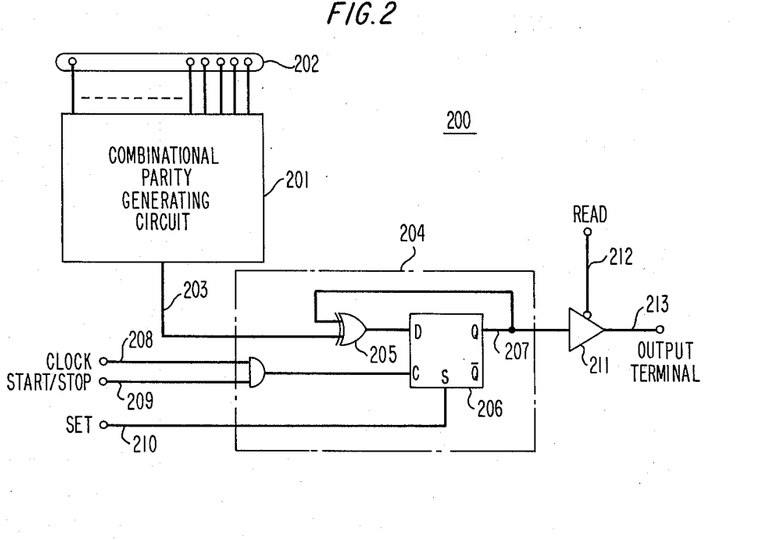
FIG. 2 is a schematic diagram of a data compression circuit including a combinational parity generating circuit and a single-bit signature generating circuit which may be used in the invention.

Referring now to FIG. 2, there is shown a schematic diagram of a data compression circuit 200 useful for reducing multiple parallel data bit-streams into a single-bit-signature while retaining significant error detection information concerning the parallel data bit-streams. The circuit comprises a combinational parity generating circuit 201 for deriving a parity bit for the bit pattern at its input terminals 202. Either an even or an odd parity generating circuit may be used. In the case of odd parity, the circuit 201 provides a "1" at its output 203 and when the bit pattern at its input contains either all "0"s or an even number of "1"s and provides a "0" at its output when the bit pattern contains an odd number of "1"s. In the case of even parity, the circuit provides a "1" when the bit pattern at its input contains an odd number of "1"s and provides a "0" when the bit pattern contains either all "0"s or an even number of "1"s.

Figure 3:
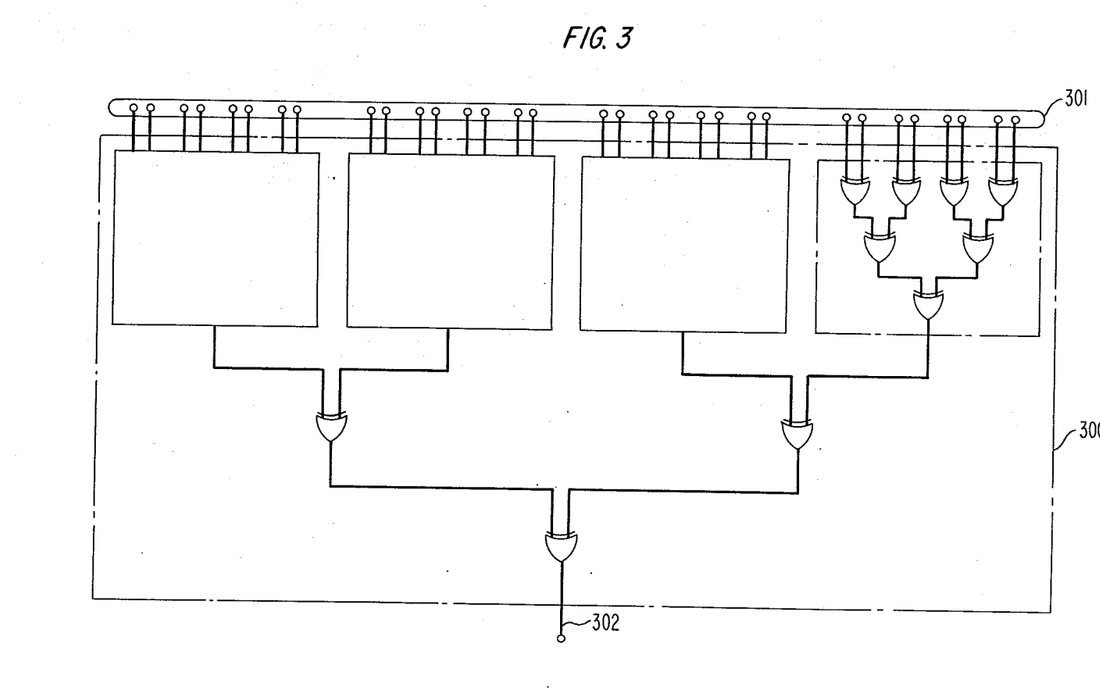
FIG. 3 is a schematic diagram of an EXCLUSIVE-OR tree circuit useful as a combinational parity generating circuit which may be used in the invention.

Many implementations of combinational parity generating circuits are known in the art. A 32-bit even parity generator implemented with 2-input EXCLUSIVE-OR gates known as an EXCLUSIVE-OR tree circuit is shown in FIG. 3. When 32 parallel signals (data bit-streams) are applied to the input terminals 301 a single parity signal (parity bit-stream) is derived at the output terminal 302. The process of reducing multiple parallel bit-streams to fewer bit-streams which carry error information concerning the original bit-streams is referred to as spatial data compression. The circuit of FIG. 3 may be used to spatially compress data signals on 32 separate nodes to a single parity signal. EXCLUSIVE-OR trees with even larger number of inputs may readily be designed.

Referring again to FIG. 2, the output 203 (parity signal) from the parity generating circuit 201 is received by a sequential signature generating circuit 204 for sampling the parity signal at a rate determined by clock signals (e.g., clock trigger pulses) applied at the clock input terminal 208 and for deriving a one-bit code called a signature from the samples of the parity signal. The signature generating circuit shown in FIG. 2 consists of a modulo-2 adder (EXCLUSIVE-OR gate) 205 and a single flip-flop 206. The normal output (Q) 207 of the flip-flop is fed back to one of the two adder inputs where it is summed with the parity signal. The flip-flop is first set to a "1" by a signal applied at the SET input 210. A clock signal which is typically the system clock from the circuit under test is applied to the CLOCK input 208 and start/stop signals are applied to the START/STOP input 210 to define the sampling interval which typically allows for thousands of state changes of the parallel signals. After sampling is halted, a signature of the sampled parity signal remains in the flip-flop. This signature is representative of the entire parity bit-stream over the sampling interval and is useful for detecting all single-bit errors and odd-multiple-bit errors in sampled parity bit-streams. The process of reducing a long serial bit-stream to a signature of one or more bits which retains error information concerning the serial bit-stream is referred to as temporal data compression. The sequential signature generating circuit 204 compresses the long parity bit-stream over a sampling interval to a single-bit signature.

The data compression circuit of FIG. 2 may be added to the circuit of FIG. 1 and connected to the designated internal nodes. Each designated internal node is connected to a single input of the combinational parity generating circuit while the signature is brought out to a single terminal of the circuit either through an output buffer 211 controlled by a read signal applied at the READ input 212 or directly from the flip-flop. Clock signals for the signature generating circuit are derived from an appropriate phase from the clock generating circuit (108 in FIG. 1) corresponding to when the data on the designated internal nodes are stable.

Depending upon the number of designated internal nodes and the number of inputs in the data compression circuit, more than one data compression circuit may be used to receive the parallel data. In such a case, the signature output from each circuit may be brought out to separate terminals or multiplexed onto a single terminal.

Figure 4:
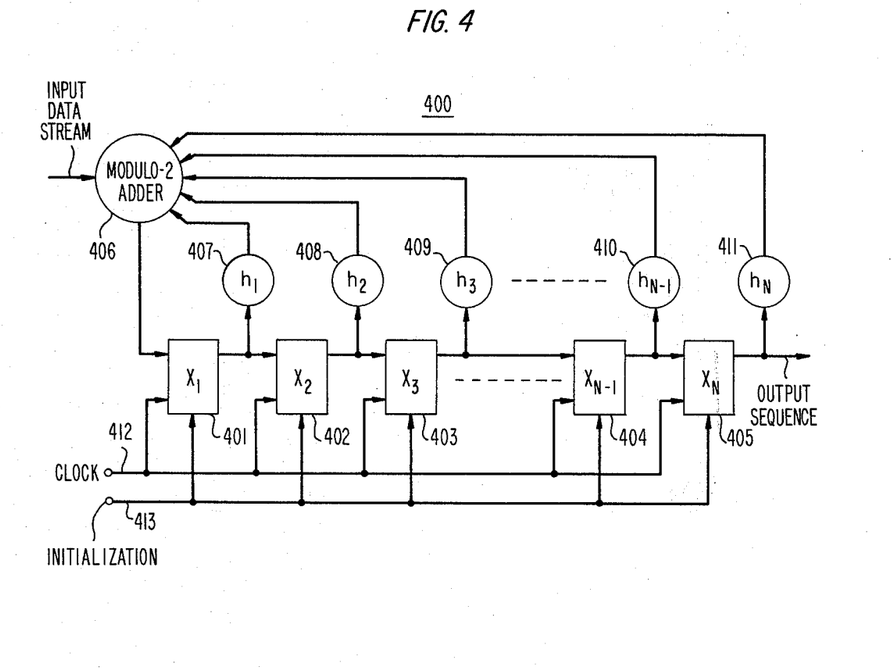
FIG. 4 is a schematic diagram of a generalized multiple-bit signature generating circuit which may be used in the invention.

The sequential signature generating circuit of FIG. 2 is the simplest form of such circuits and has a limited capability for detecting multiple-bit errors in the parity signal. A generalized configuration for a sequential signature generating circuit is shown in FIG. 4 and takes the form of a linear feedback shift register circuit consisting of a modulo-2 summation of selected taps of the shift register with the input serial data stream. Such feedback shift register arrangements are also known as cyclic redundancy check generators or pseudo-random sequence generators and are well known.

Turning now to FIG. 4, the generalized sequential signature generator circuit 400 comprises a number N flip-flop stages ($X_1$ to $X_N$) 401, 402, 403, 404, and 405. The outputs from selected stages are fed back to a modulo-2 adder 406 where they are added to the input data stream. Shift register stages $X_4$ to $X_{N-2}$ have been omitted from the depiction. Whether the output from a given stage $X_M$ is to be fed back is determined by the feedback function, $h_M$, for that stage. The feedback functions which are designated by reference numerals 407 to 411 are generally selected to achieve a shift register circuit which generates an output sequence (from the last stage) of maximum length without the sequence repeating itself. The selection of the feedback function is generally made in accordance with the well-known theory of shift register sequences as described, for example, in "Shift Register Sequences" by S. Golomb, published in 1967 by Holden-Day Inc.

The shifting of the data and the sampling of the input data-stream are controlled by clock pulses applied at the CLOCK input 412. The shift register is first initialized to a given state prior to start of the sampling interval by applying a pulse to the INITIALIZATION input 413.

The capability of a sequential signature generator circuit to detect multiple-bit errors in the input data stream increases rapidly with the number of stages in the shift register circuit. For a shift register circuit having N stages and adapted to generate a sequence of maximum length, the percentage probability of detecting an error of however many bits in an input data stream having a length much greater than N is:

$$100 - 100(1/2^N).$$

Thus, for a shift register circuit having 16 stages, the probability of error detection in a long bit-stream is 99.998 percent. However, since according to the present invention the data compression circuitry is to be situated on an integrated circuit chip, there will normally be a design trade-off between the accuracy of the error detection and the overhead chip area occupied by data compression circuitry. A designer of a circuit must choose between longer shift register circuits yielding more accurate signature analysis but requiring larger overhead chip area or shorter shift register circuits yielding less accurate signature analysis but requiring smaller overhead chip area.

Figure 5:
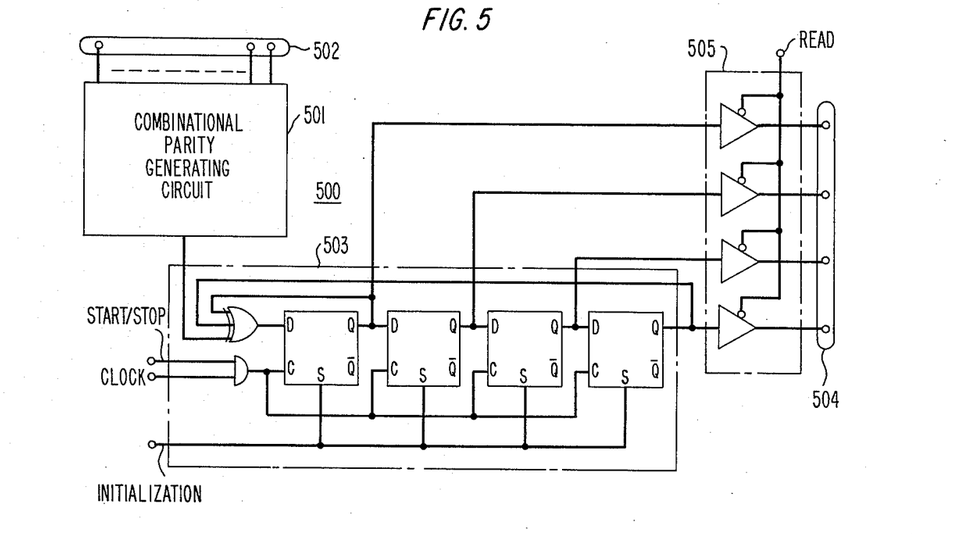
FIG. 5 is a schematic diagram of a data compression circuit including a combinational parity generating circuit and a four-bit signature generating circuit which may be used in the invention.
Figure 6:
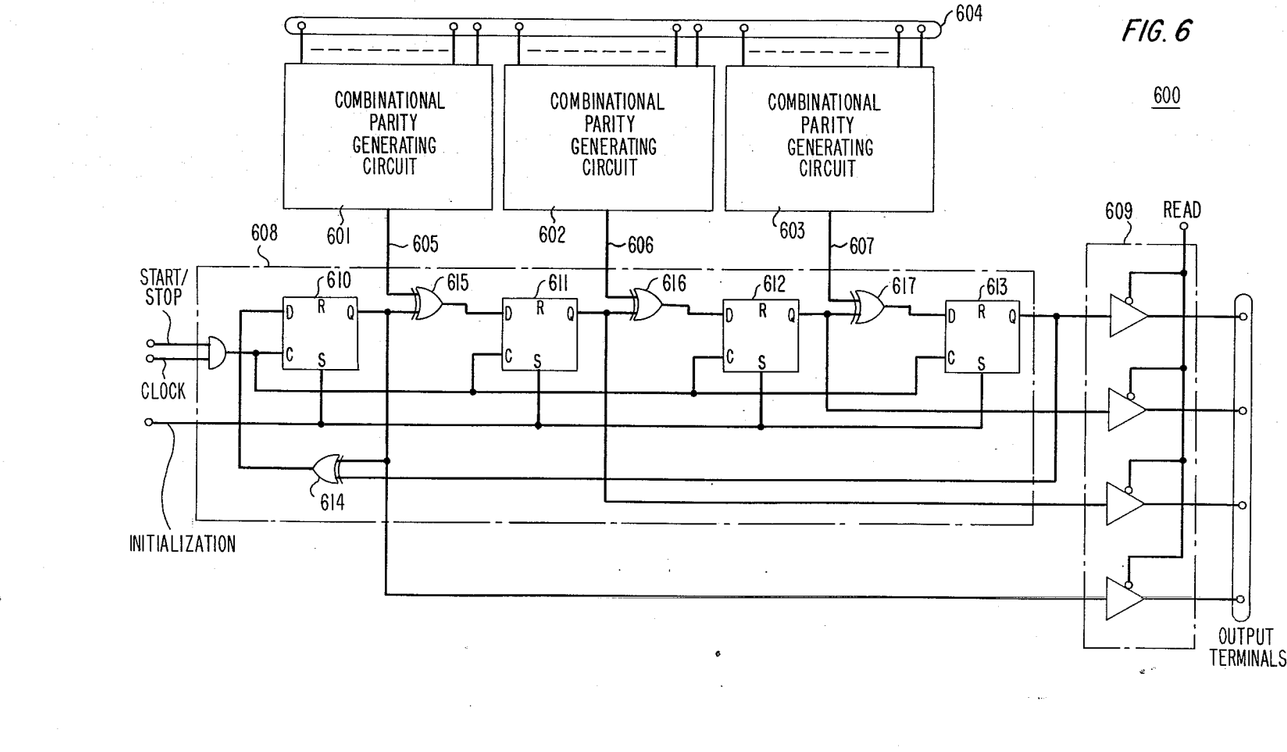
FIG. 6 is a schematic diagram of a data compression circuit including three combinational parity generating circuits and a four-bit signature generating circuit which may be used in the invention.

Referring now to FIG. 5, there is shown a data compression circuit 500 having a combinational parity generating circuit 501 for spatial compression of parallel data received at data inputs 502 and a sequential signature generating circuit 503 for temporal compression of a parity bit-stream provided by the parity generating circuit. The sequential signature generating circuit comprises a four-stage shift register circuit for providing a maximum length sequence and for storing a four-bit signature which may be transferred to four terminals 504 of the circuit through four output buffers 505. The functions of the CLOCK, START/STOP, INITIALIZATION, and READ inputs are the same as described in connection with the circuit of FIG. 2. The use of four shift register stages in the signature generating circuit provides a 93 percent probability of detecting single or multiple-bit errors in long parity bit-streams.

Where more than one combinational parity generating circuit is needed to receive the parallel data, it would not be practical from the standpoint of overhead chip area to use a separate multistage shift register circuit with each parity generating circuit. Turning now to FIG. 6, there is shown a data compression circuit 600 having three combinational parity generating circuits 601, 602, and 603 for spatial compression of parallel data received at their inputs 604 and for providing three parity data streams at nodes 605, 606, and 607. The three parity data streams are received by a single four-stage shift register circuit 608 for generating a four-bit signature for all three parity bit-streams. Owing to the linear nature of the shift register circuit, multiple input bit streams may be superimposed for signature analysis. The feedback connections of the shift register circuit are selected to provide a circuit for generating a maximum length sequence. Although a four-stage shift register circuit is shown in FIG. 5, longer shift register circuits may be used for more accurate signature analysis and for receiving more parity data streams.

It is to be noted that spatial data compression of parallel data steams by deriving one or more parity bit streams therefrom can provide detection of only single-bit errors and odd-multiple-bit errors in the parallel data streams. It has been found that in most cases fault coverage in functional testing is not significantly affected by the failure to detect at any given instant of time all multiple-bit error in the parallel data on the internal nodes of a circuit under test. However, where it is desired to increase the detection capability of multiple-bit errors in the parallel data, multiple combinational parity generating circuits may be used to make redundant parity checks on certain combinations of the parallel data to provide a multiple-bit code capable of detecting multiple-bit errors in the parallel data. Such codes, as for example the Hamming code, and the methods for their generation with parity generating circuit are well known in the art of error detection and error correction of digital signals. The outputs from the multiple parity generating circuits can then be combined by a single shift register circuit in the manner shown in FIG. 6 to derive a single multiple bit signature.

For production and diagnostic testing the signature output from an LSI circuit constructed in accordance with the instant invention is treated as part of the output pattern from the circuit under test. The error information provided by the signature increases the fault coverage and permits the use of shorter test vector sequences. However, even greater advantages are derived from the instant invention for field-site testing. Since an LSI circuit provided with data compression circuitry may be tested with a high fault coverage simply by examining its signature output and comparing it with an expected signature from a fully functioning circuit. Such tests can be performed while the circuit is in actual operation. A common method for field-site testing of an integrated circuit in a high reliability system is to operate two or more such circuits in parallel and to compare each output from one circuit with those of the others. For LSI circuits provided with data compression circuitry, only the signature outputs from each circuit need be compared to achieve functional testing with higher fault coverage than can be obtained from comparing the other outputs. Signature comparison can be performed without interfering with the normal operation of the circuit.

Figure 7:
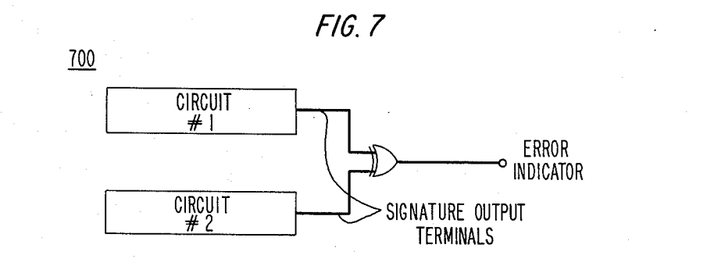
FIG. 7 shows a schematic diagram of an arrangement for comparing signatures from two identical circuits which may be used in the invention.

Referring now to FIG. 7, there is shown an arrangement for comparing selectively only one-bit signatures from two identical circuits. To perform a comparison, specific initialization, start, and stop signals must be applied to each circuit to initialize each signature generating circuit and to define the interval for sampling of the data. A read signal is applied to each circuit after data sampling is completed to transfer the signature from each circuit to its proper output terminal. An erroneous signature from one of the circuits causes a logical "1" to appear at the ERROR INDICATOR output.

Figure 8:
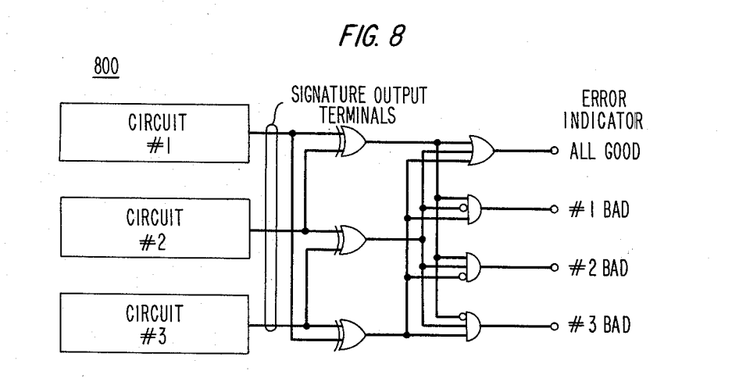
FIG. 8 shows a schematic diagram of an arrangement for comparing signatures from three identical circuits which may be used in the invention.

Turning now to FIG. 8, there is shown an arrangement for comparing one-bit signatures from three identical circuits. The comparison circuitry specifies which circuit, if any, is producing a signature which is different from the others by providing a logical "1" at one of the ERROR INDICATOR outputs. It is presumed that the majority of the circuits would be functioning properly. Although the signature comparison arrangements shown in FIGS. 7 and 8 are adapted to compare one-bit signatures, similar arrangements for comparing multi-bit signatures may be readily derived by one skilled in the art of logic circuit design.

I claim:

1. An LSI circuit logic structure for improved testability comprising a plurality of terminals (104), a plurality of functional parts (101, 105, 106, 108, 109, 110, 111) interconnected at a multiplicity of internal nodes (113, 114, 115, 116, 117, 118) and clock generating circuit means (108) for providing a sequence of clock pulses;
characterized in that there are included spatial data compression means comprising combinational parity generating circuit means (201, 501, 601, 602, 603) coupled to selected ones of the internal nodes and responsive to signals on the selected ones of the internal nodes for deriving a parity signal, temporal data compression means comprising sequential signature generating circuit means (204, 503, 608) responsive to the sequence of clock pulses for sampling the parity signal over a fixed interval of time and for generating and storing a signature word of a predetermined length, and output means (211, 505, 609) for transferring the signature word from the signature generating circuit means to selected ones of the terminals.

2. An LSI circuit logic structure as recited in claim 1 further characterized in that the sequential signature generating circuit means comprise a flip-flop (206) providing an output signal, a modulo-2 adder (205) connected to receive the output signal from the flip-flop and the parity signal and to provide a sum signal to the flip-flop, the flip-flop having a clock input (208) connected to receive the sequence of clock pulses.

3. An LSI circuit logic structure as recited in claim 2 further characterized in that the combinational parity generating circuit means comprise an EXCLUSIVE-OR tree circuit (300) and the modulo-2 adder comprise an EXCLUSIVE-OR gate (205).

4. An LSI circuit logic structure as recited in claim 1 further characterized in that the sequential signature generating circuit means comprise a shift register circuit (400, 503, 608) having a predetermined number of stages including a first (401) and a last (405) stage, each stage providing an output signal, a modulo-2 adder (406) connected to receive the output signals from selected ones of the stages and the parity signal and to provide a sum signal to the first stage, the shift register circuit having a clock input (412) connected to receive the sequence of clock pulses.

5. An LSI circuit logic structure as recited in claim 4 further characterized in that the selection of the stages of the shift register circuit which are connected to the modulo-2 adder provides a circuit which generates a sequence of maximum length.

6. An LSI circuit logic structure for improved testability comprising a plurality of terminals (104), a plurality of functional parts (101, 105, 106, 108, 109, 110, 111) interconnected at a multiplicity of internal nodes (113, 114, 115, 116, 117, 118) not directly connected to any of the terminals, clock generating means (108) for providing a sequence of clock pulses;
characterized in that there are included spatial data compression means comprising two or more combinational parity generating circuits (601, 602, 603) each coupled to respective ones of the internal nodes and each responsive to signals on the respective ones of the internal nodes for deriving a parity signal; temporal data compression means comprising a shift register circuit (608) having a number of stages including a first (610) and a last (613) stage, the number of stages being greater than the number of parity generating circuits, the shift register circuit having a clock input for receiving the sequence of clock pulses and being responsive thereto for sampling each parity signal over a fixed interval of time and for generating and storing a signature word having a length equal to the number of stages; and output means (609) for transferring the signature word from the shift register circuit to selected ones of the terminals.

7. An LSI circuit logic structure as recited in claim 6 further characterized in that each stage of the shift register circuit provides an output signal and there are included a first modulo-2 adder (614) connected to receive the output signals from selected ones of the stages and to provide a sum signal to the first stage, two or more additional modulo-2 adders (615, 616, 617) each associated with a respective one of the stages except the last stage and connected to receive the output signal from the associated stage and the parity signal from a respective one of the parity generating circuits and to provide a summation signal to a stage immediately following the associated stage.

8. An LSI circuit logic structure as recited in claim 7 further characterized in that the selection of the stages of the shift register circuit which are connected to the first modulo-2 adder provides a circuit which generates a sequence of maximum length.

9. An LSI circuit logic structure as recited in claim 8 further characterized in that the combinational parity generating circuits comprise EXCLUSIVE-OR tree circuits and the first and additional modulo-2 adders in the shift register circuit comprise EXCLUSIVE-OR gates.

10. A microprocessor logic structure for improved testability comprising a plurality of terminals; a plurality of functional parts including an instruction-register (105) for receiving and storing at least a portion of an instruction, control logic circuitry (106) for decoding the contents of the instruction register and for generating a sequence of control signal patterns on a plurality of control lines (107), the control signal patterns for governing the function of each functional part in the execution of a processor operation specified by the instruction; an internal data bus (102) for carrying instructions, addresses and data; I/O circuitry (101) for controlling the bidirectional transfer of instructions, addresses and data between the internal data bus and particular ones of the terminals (104); ALU circuitry (110) for performing arithmetic and logic operations; and clock generating circuitry (108) for providing one or more sequences of clock pulses for controlling the timing of the sequence of control signals, characterized in that there are included spatial data compression means comprising combinational parity generating circuit means (201, 501, 601, 602, 603) coupled to at least the plurality of control lines and responsive to the sequence of control signal patterns for deriving one or more corresponding sequences of parity signals, temporal data compression means comprising sequential signature generating circuit means (204, 503, 608) responsive to a specific one of the one or more sequences of clock pulses for sampling the one or more sequences of parity signals over a fixed interval of time and for generating and storing a signature word of a predetermined length, and output means (211, 505, 609) for transferring the signature word from the sequential signature generating circuit means to selected ones of the terminals.

* * * * *